United States Patent [19]

McCombs

[11] 3,925,980

[45] Dec. 16, 1975

[54] CONTROL APPARATUS PARTICULARLY FOR A PLURALITY OF COMPRESSOR BLEED VALVES OF GAS TURBINE ENGINE

[75] Inventor: Howard L. McCombs, South Bend, Ind.

[73] Assignee: The Bendix Corporation, South Bend, Ind.

[22] Filed: July 22, 1974

[21] Appl. No.: 490,624

Related U.S. Application Data

[62] Division of Ser. No. 289,404, Sept. 15, 1972, Pat. No. 3,848,636.

[52] U.S. Cl. .................... 60/39.29; 415/28; 60/226; 137/596.15; 137/625.63; 137/624.27; 137/627.5; 137/625.5
[51] Int. Cl.² .......................................... F02C 9/14
[58] Field of Search ............... 60/39.29; 73/407 PR; 415/27, 28; 137/627.5, 608, 107

[56] References Cited
UNITED STATES PATENTS 2,978,166   4/1961   Hahn ........................... 60/39.29 X
3,646,753   3/1972   Colman ......................... 60/39.29 X Primary Examiner—Clarence R. Gordon
Attorney, Agent, or Firm—Gordon H. Chenez; William N. Antonis

[57] ABSTRACT

Control apparatus for programmed control of a plurality of gas turbine engine compressor air bleed valves in response to a plurality of control input signals representing engine operating conditions including variable conditions related to engine power output. The control inputs are sensed and/or computed and scheduled to provide accurate and reliable control over a plurality of compressor air bleed valves by means including a hydraulic programmer with a three dimensional compressor rise scheduling cam and adjustable hydraulic timers.

7 Claims, 15 Drawing Figures

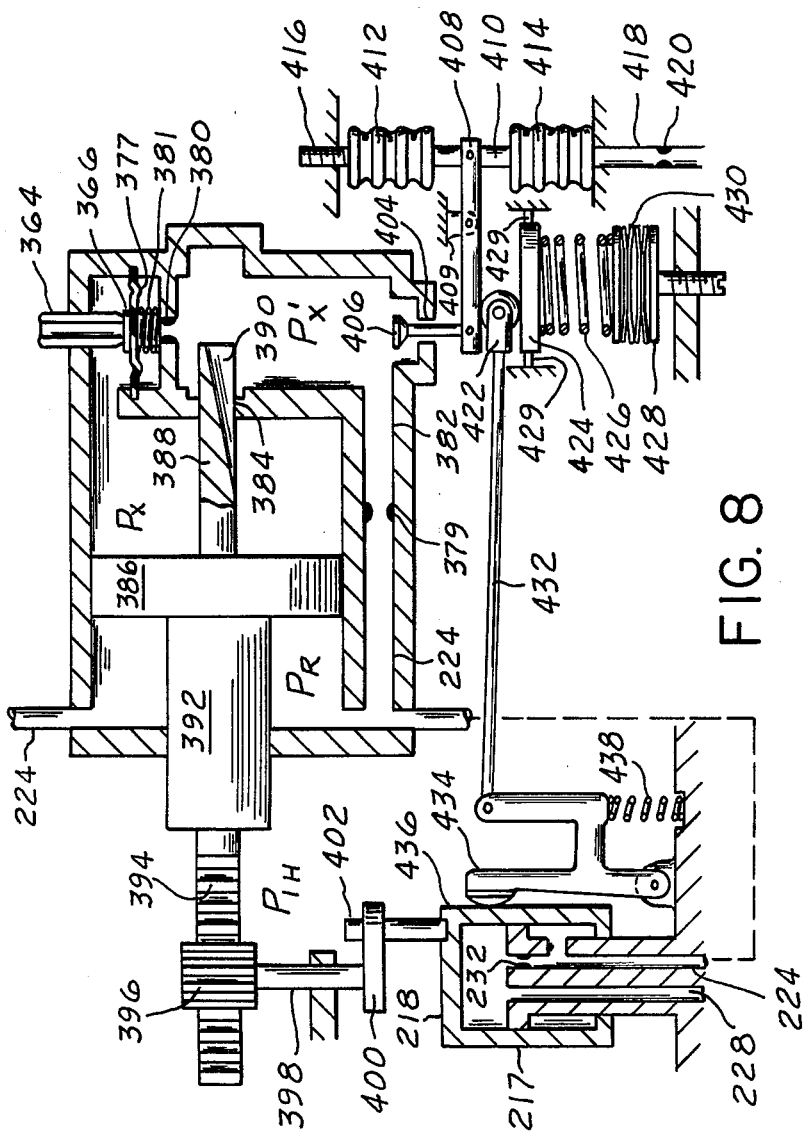

CONTROL APPARATUS PARTICULARLY FOR A PLURALITY OF COMPRESSOR BLEED VALVES OF GAS TURBINE ENGINE

BACKGROUND OF THE INVENTION

The present invention relates to compressor air bleed valve control apparatus particularly for a gas turbine engine.

It is well known to utilize compressor air bleed valves and control apparatus therefor to vent pressurized air from a multiple stage air compressor to control the air pressures and/or flow therethrough. The bleed valves may be connected to selected stages or all of the stages to control the air pressures thereof by venting the stages simultaneously or by selective venting of the stages depending upon the characteristics of the engine and/or air compressor associated therewith. A compressor such as a multiple stage axial flow compressor used in high performance aircraft gas turbine engines requires bleed valve control in response to one or more variable operating conditions which may include flight altitude, engine reverse thrust, engine start, compressor inlet and/or discharge air pressures as well as engine acceleration and deceleration. The desired control over the bleed valves in response to the variable operating conditions may result in control circuitry which increases in complexity in proportion to the number of different operating condition control input signals imposed thereon. Since aircraft control component structure volume and weight must be minimized with no sacrifice in accuracy and/or reliability, it is obvious simple and reliable control elements capable of withstanding engine environment heat and vibration are essential. Furthermore, it is desirable to establish control flexibility whereby the control apparatus may be quickly and easily adjusted and/or modified for use with different engines having correspondingly different engine, including compressor, operational characteristics.

SUMMARY OF THE INVENTION

It is an object of the present invention to provide control apparatus for controlling a plurality of compressor air bleed valves of a gas turbine engine wherein opening of each bleed valve is controlled as a predetermined function of one or more variable conditions of operation affecting engine power output.

It is another object of the present invention to provide compact, rugged and reliable control apparatus for controlling a plurality of compressor air bleed valves of a gas turbine engine.

It is an object of the present invention to provide gas turbine engine air compressor multiple bleed valve apparatus with control apparatus including sensing and/or computing means responsive to a plurality of variable conditions of operation affecting engine power output for controlling operation of the bleed valves individually in response to predetermined values of one or more of said variable conditions of operation.

It is another object of the present invention to provide fluid flow control apparatus for programmed control of a plurality fluid flow passages in response to a plurality of input variable conditions of operation.

BRIEF DESCRIPTION OF THE DRAWINGS

FIG. 8 is an enlarged schematic view in section of a compressor stall sensor portion of the present invention.

FIG. 9 is an enlarged view of one of the control valves shown in FIG. 3;

DESCRIPTION OF THE PREFERRED EMBODIMENT

Figure 1:
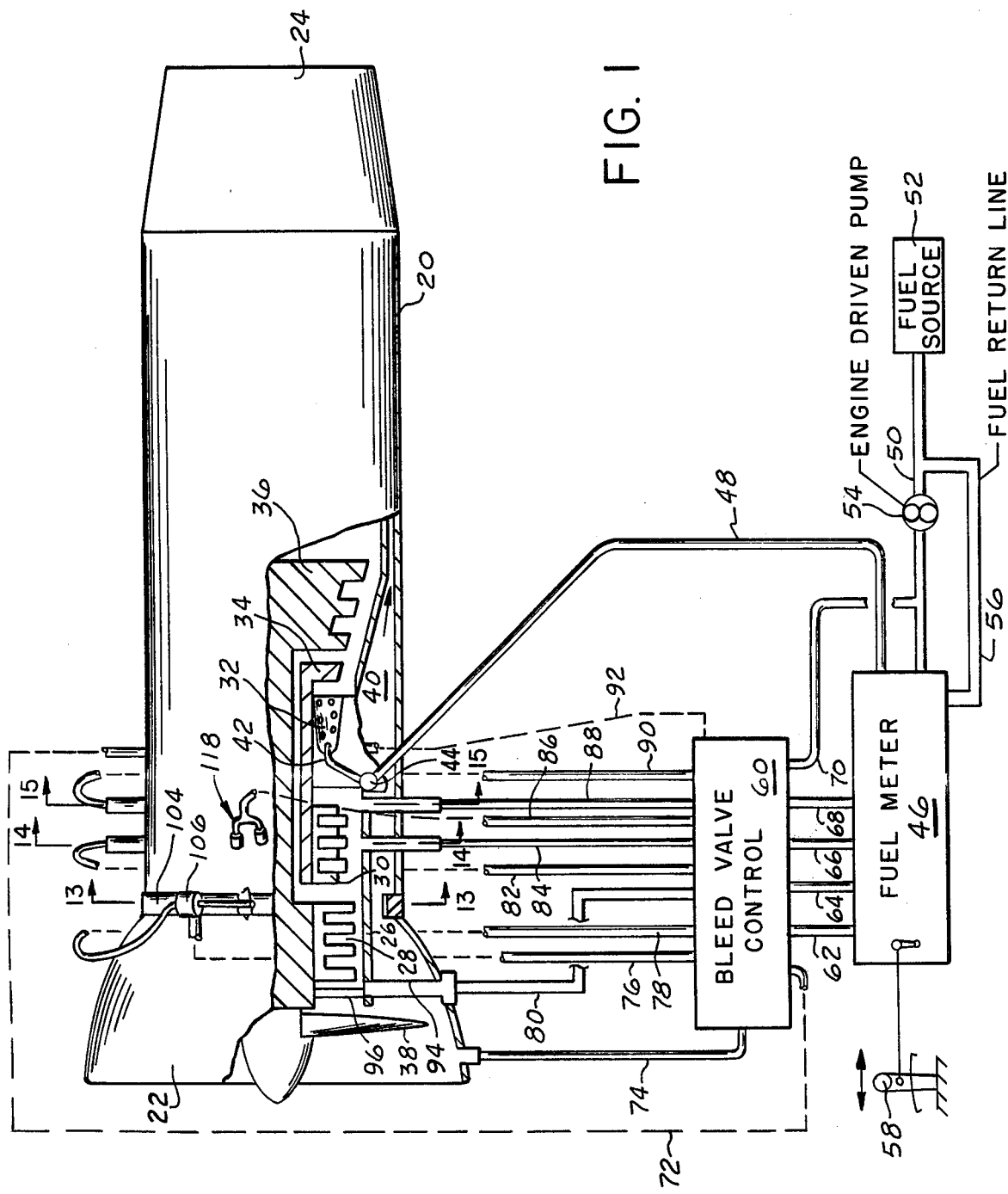
FIG. 1 is a schematic representation of a fan type gas turbine engine including a multiple stage air compressor of the axial type and air compressor bleed valve control apparatus therefor embodying the present invention shown in black form.

FIG. 1 illustrates a conventional fanjet gas turbine engine having a casing 20 provided with an air inlet 22 and gas discharge nozzle 24 and housing an inner casing 26. The inner casing 26 houses independently rotatable series flow low and high pressure compressors 28 and 30, respectively, of the multiple stage axial flow type which receive air from inlet 22 and deliver the same to a plurality of combustion chambers 32 wherein the air is mixed with fuel to generate hot motive gas. The hot motive gas is discharged from the combustion chambers 32 and directed through independently rotatable gas turbines 34 and 36 to the nozzle 24 from which the hot motive gas is discharged to the atmosphere to generate propelling thrust. The gas driven turbines 34 and 36 are suitably connected to drive compressors 30 and 28, respectively. A fan 38 driven by turbine 36 serves to propel air from inlet 22 to an annular duct 40 between casings 20 and 26 from which the air passes to merge with the hot motive gas discharged from turbine 36.

Fuel is supplied to combustion chambers 32 via fuel nozzles 42 which communicate with an annular manifold 44 to which metered fuel is supplied from a fuel meter 46 via a fuel conduit 48. A fuel supply conduit 50 connects fuel meter 46 with a fuel source 52. An engine drive fuel pump 54 in fuel conduit 50 serves to pressurize fuel flow to fuel meter 46. A fuel return passage 56 communicates fuel meter 46 with conduit 50 on the inlet or low pressure side of fuel pump 54.

The fuel meter 46 is conventional and reference is made to U.S. Pat. No. 3,232,053 issued Feb. 1, 1966 to F. R. Rogers et al (common assignee) for an example thereof. It will be understood that the fuel meter 46 may be responsive to various control input signals including the position of a power control lever 58 suitably connected thereto and a plurality of engine operating conditions including engine speed, engine operating pressures and temperatures as well as ambient air conditions as described in detail in U.S. Pat. No. 3,232,053.

The compressors 28 and 30 are of the multiple stage axial flow type and are provided with compressor air bleed valves for venting pressurized air therefrom to a suitable relative low pressure drain source such as annular duct 40 in response to predetermined conditions of engine operation to control compressor air pressures and/or flow as will be recognized by those persons skilled in the appropriate art. To that end, the present invention, in its preferred embodiment, is shown in block form and labeled Bleed Valve Control and further identified by numeral 60.

The bleed valve control 60 is provided with a plurality of control input passages 62, 64, 66, 68, 70, 72 and 74 and a plurality of control output passages 76, 78, 80, 82, 84, 86, 88 and 90. The input passages 62, 64, 66, and 68 are connected to fuel meter 46 and transmit fluid pressure signals generated within fuel meter 46 to bleed valve control 60 for control purposes as will be described hereinafter. Passage 62 is a fuel drain or return line at relatively low pressure $P_{IH}$, passage 64 transmits a fuel pressure signal $P_{FS}$ indicative of engine starting operation, passage 66 transmits a fuel pressure signal $P_{DBO}$ indicative of an engine deceleration and passage 68 transmits supply fuel at pressure $P_H$. The passage 70 connects bleed valve control 60 with conduit 56 at pump 54 discharge pressure $P_M$. Passages 72 and 74 communicates bleed valve control 60 with compressor 30 discharge air pressure $P_{S4}$ and inlet 22 air pressure $P_{t2}$, respectively. A passage 92 supplies air at compressor discharge pressure $P_{S4}$ to bleed valve control for control purposes as will be described.

A conventional fluid actuated motor 94 connected to actuate adjustable air inlet guide vanes 96 at the inlet to compressor 28 is connected to receive a fuel pressure signal $P_{BR}$ via control output passage 80 from bleed valve control 60.

Figure 13:
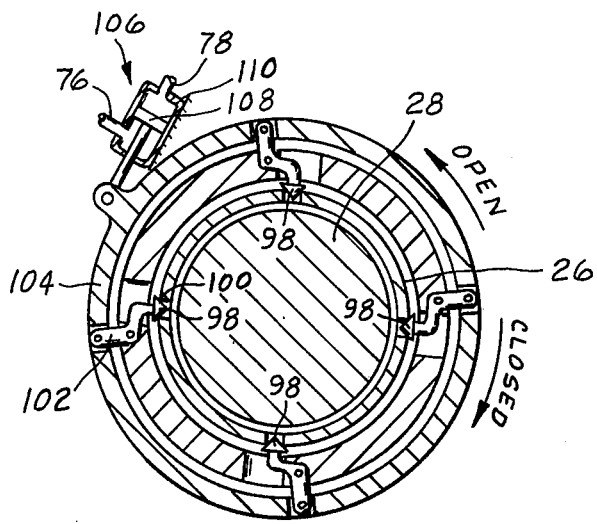
FIG. 13 is a section view taken on line 13—13 of FIG. 1.

As mentioned, the compressor 28 and 30 are of the multiple stage axial flow type. Referring to FIGS. 1 and 13 a plurality of compressor bleed valves 98 arranged in circumferentially spaced apart relationship around one stage, namely the last or highest pressure stage of compressor 28, are adapted to move into or out of engagement with openings 100 in casing 26 to control air flow from compressor 28 to relatively lower pressure air passing through duct 40. As shown in FIG. 13 each of the valves 98 are connected to one end of a pivotally mounted lever 102, the opposite end of which is pivotally connected to an annular actuating ring 104 surrounding casing 20. A fluid motor 106 including a piston 108 slidably carried in a fixed cylinder 110 is connected to rotate the ring 104 thereby causing simultaneous opening or closing of the four valves 98. Opposite sides of piston 108 are vented to control output passages 76 and 78 at pressures $P_{BC}$ and $P_{BO}$, respectively.

Figure 14:
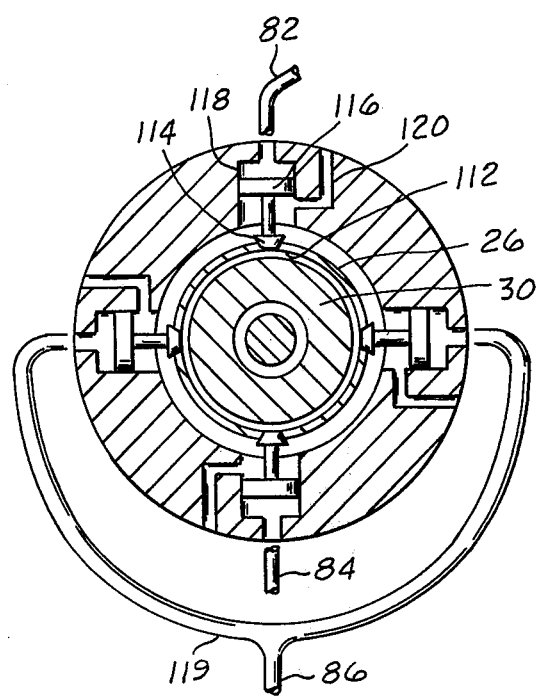
FIG. 14 is a section view taken on line 14—14 of FIG. 1.

The compressor 30 is provided with air bleed valves in two stages thereof. An intermediate stage is provided with four circumferentially spaced apart openings 112 in casing 26 as shown in FIG. 14. A bleed valve 114 movable into and out of seating engagement with each opening 112 controls air flow therethrough from compressor 30 to duct 40. Each bleed valve 114 is actuated by an associated piston 116 slidably carried in a cylinder 118 and vented on one side to atmospheric air pressure $P_a$ via a passage 120. The opposite side of each piston 116 is vented to one of three control output passages leading from bleed valve control 60. To that end, diametrically opposite pistons 116 are vented to control output passages 82 and 84, respectively. The remaining two diametrically opposite pistons 116 are vented to control output passage 86 which is bifurcated as at 119.

Figure 15:
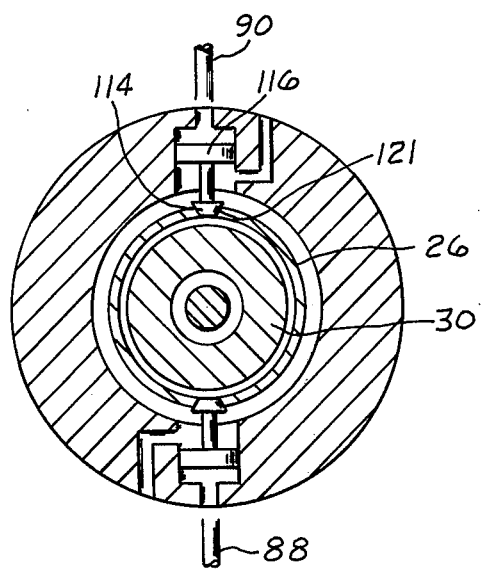
FIG. 15 is a section view taken on line 15—15 of FIG. 1.

A second stage, namely the last or highest pressure stage, of compressor 30 is provided with diametrically opposite openings 121 which, as in the case of opening 112, are controlled by associated bleed valves 114 actuated by pistons 116 exposed on one side to atmospheric air pressure as shown in FIG. 15. The opposite sides of the diametrically opposed pistons 116 are vented to control output passages 88 and 90, respectively.

Figures 2, 12:
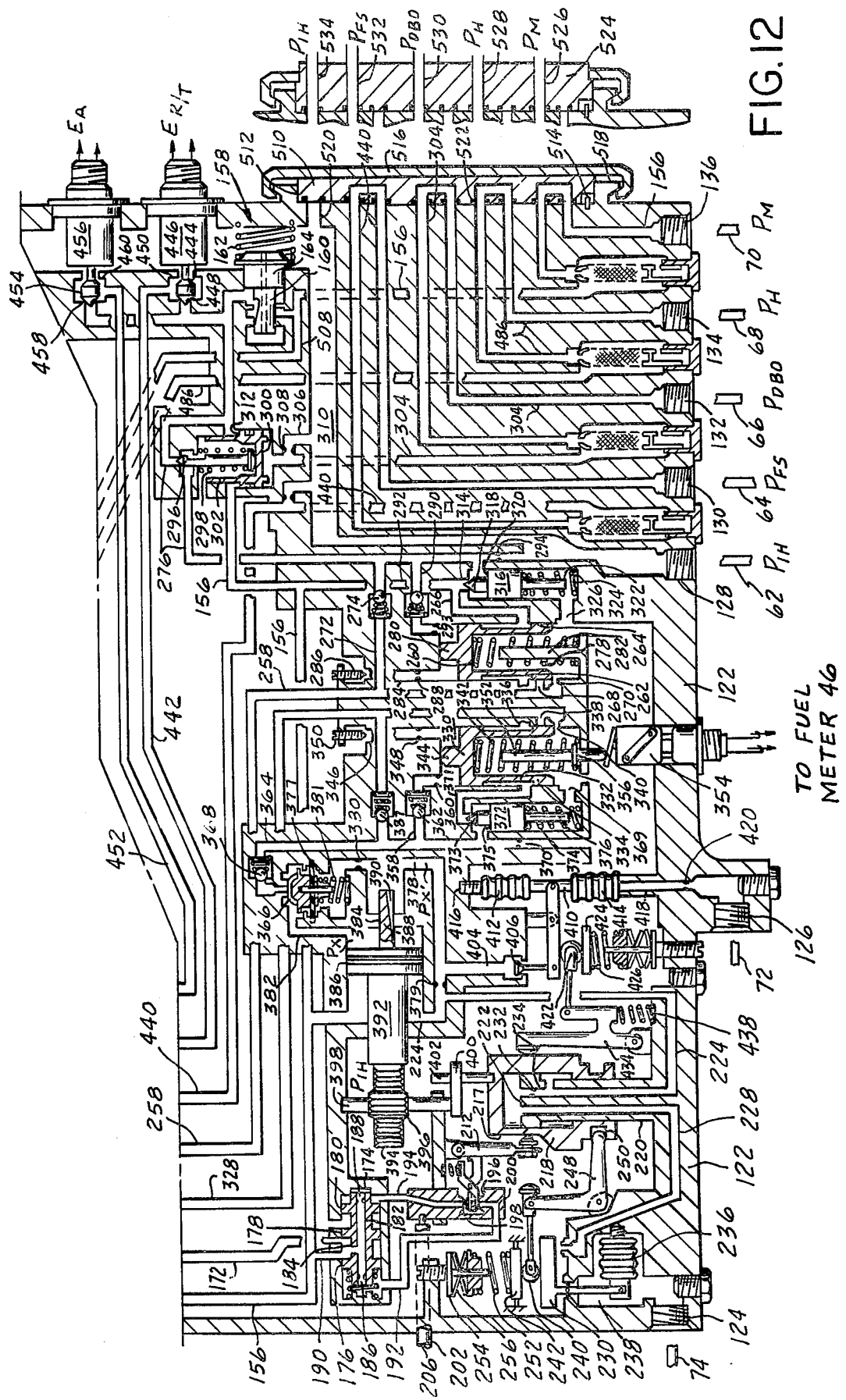
FIG. 2 is a schematic view in section of a portion of the control apparatus embodying the present invention.
FIG. 12 designates a plate adapted to be connected to the casing of FIG. 1 for ground check operation.
Figure 3:
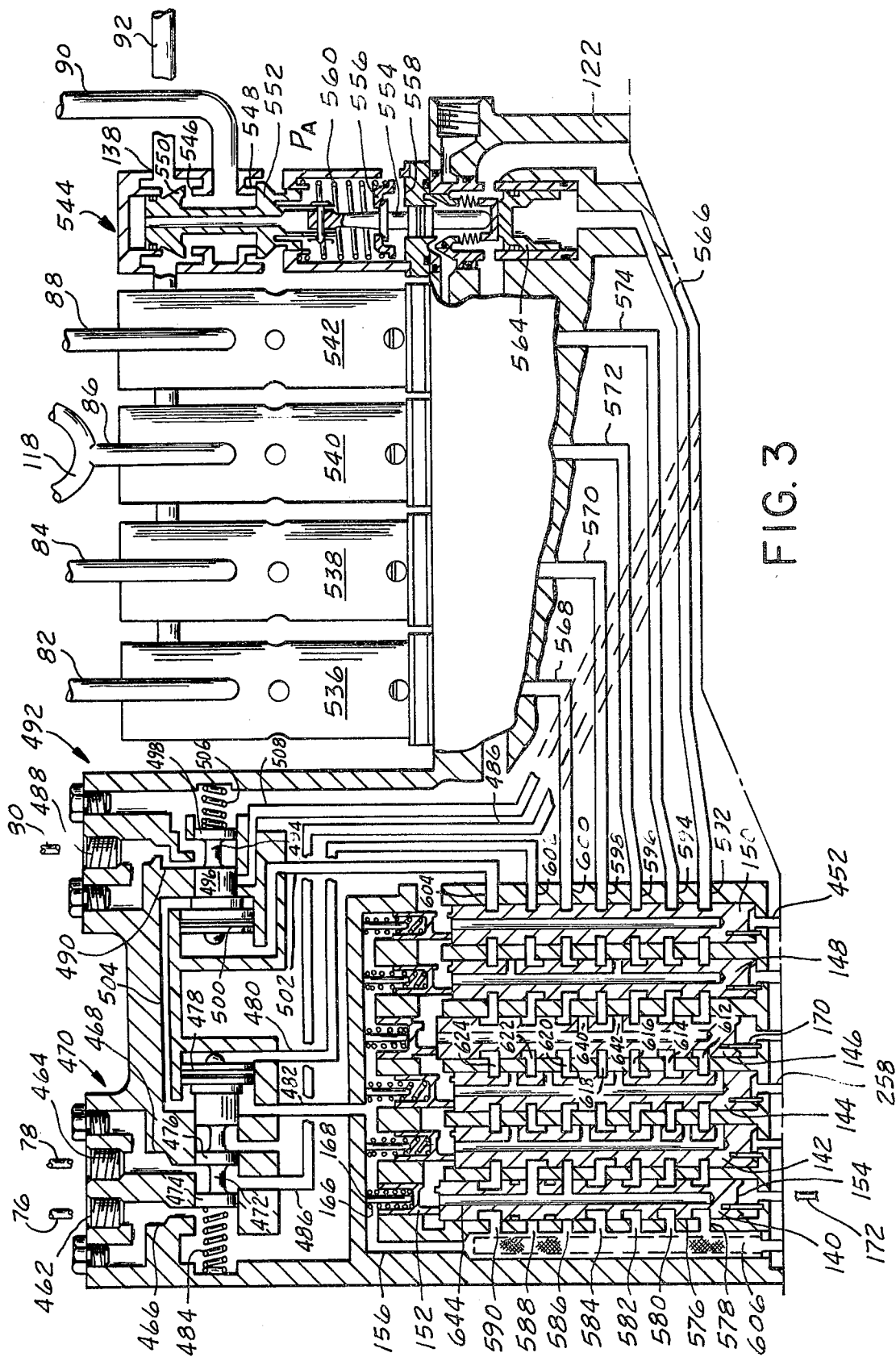
FIG. 3 is a schematic view in section of the remaining portion of the control apparatus embodying the present invention.
Figure 4:
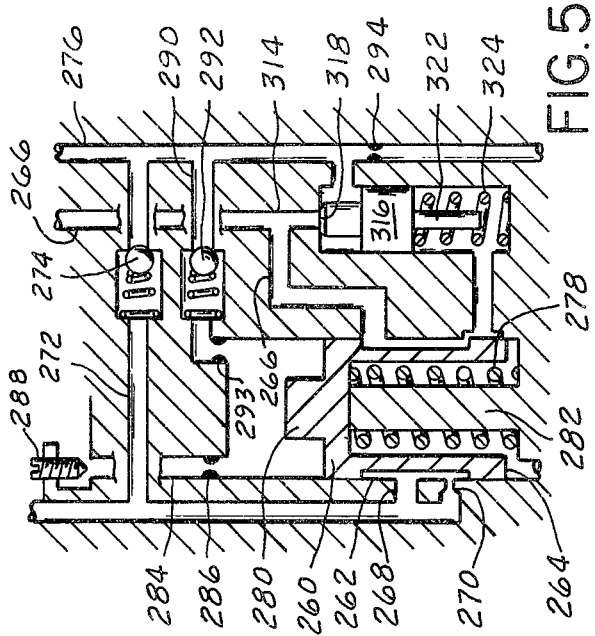
FIG. 4 is an enlarged schematic view in section of a hydraulic timer portion of the present invention.
Figure 5:
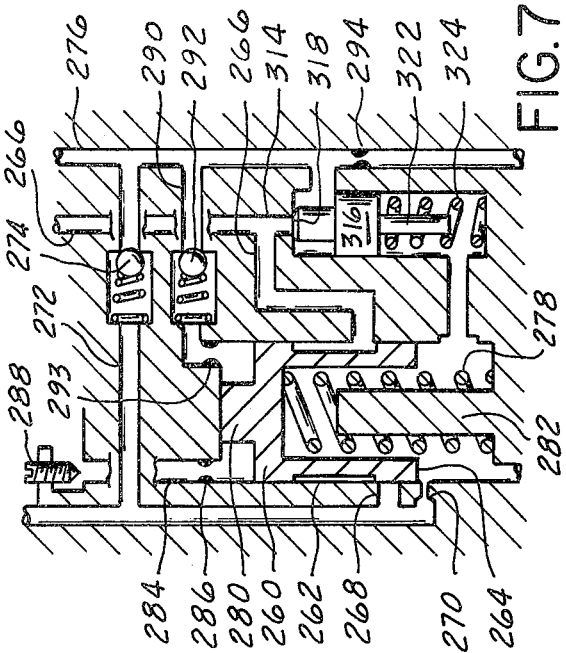
FIGS. 5, 6 and 7 are similar to FIG. 4 but show the hydraulic timer portion in various operating positions.
Figure 6:
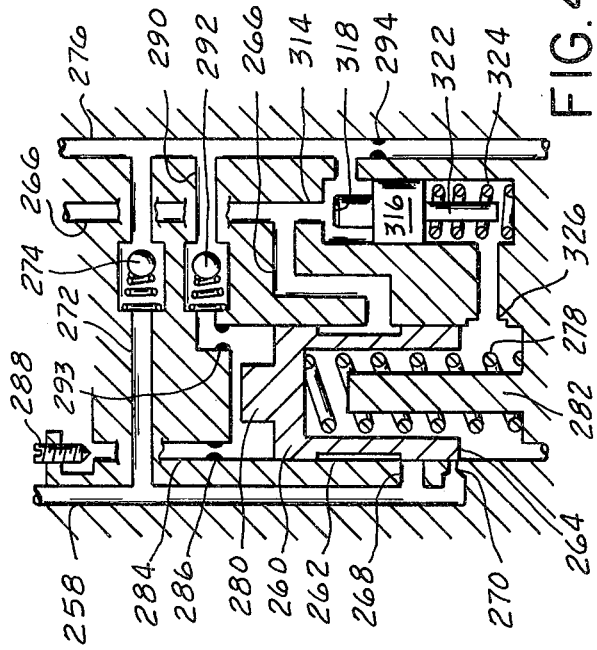
Figure 7:
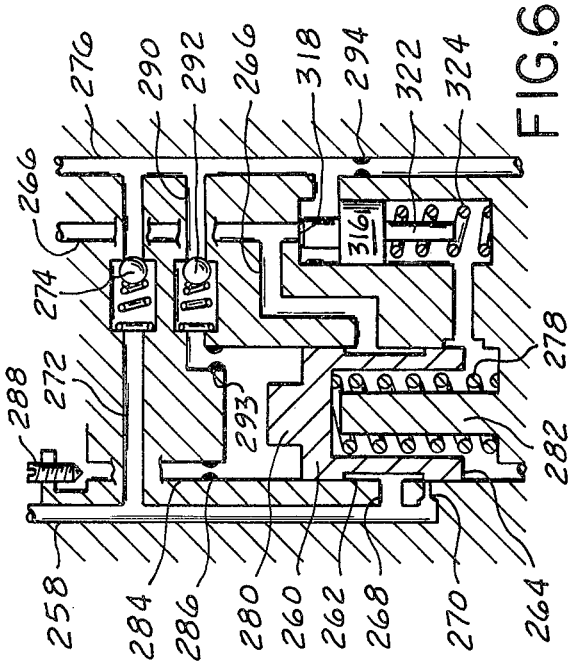

Referring to FIGS. 2 and 3 which together show the interior elements of bleed valve control 60 numeral 122 represents a casing having ports 124, 126, 128, 130, 132, 134, 136 and 138 to which are connected input passages 74, 72, 62, 64, 66, 68, 70 and 92, respectively.

A plurality of fluid pressure actuated valves 140, 142, 144, 146, 148 and 150 slidably carried in casing 122 are each provided with piston portions 152 and 154 at opposite ends thereof. The piston portions 152 are vented to fuel at a regulated constant pressure $P_R$ derived from pump discharge pressure $P_M$ via a conduit 156 leading to port 136. A conventional fuel pressure regulating valve 158 suitably located in conduit 156 serves to throttle fuel flow therethrough to reduce the fuel pressure from $P_M$ to a constant regulated pressure $P_R$. The regulating valve 158 is conventional in that it includes an axially movable variable area valve member 160 biased toward a closed position by a compression spring 162 the force of which is opposed by fuel pressure $P_R$ acting against an annular piston portion 164 of regulating valve 158.

The pressure actuated valves 140, 142, 144, 146, 148 and 150 are each loaded by an associated compression spring 166 interposed between casing 122 and piston portion 152 which spring urges the latter away from a fixed stop 168. Each of the valves is restricted to axial movement by an associated pin 170 fixedly secured at one end to casing 122 and slidably received by a mating opening in the valve.

Figure 11:
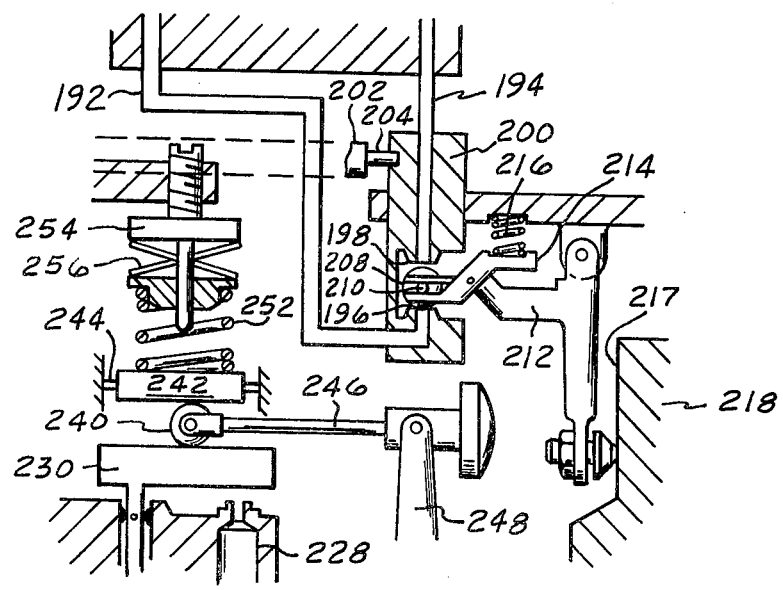
FIG. 11 is an enlarged schematic view of a portion of FIG. 2 showing double servo orifices and valve cooperating therewith.

The piston portion 154 of valve 140 is vented via a passage 172 to a two position spool valve 174 slidably carried by casing 122. The spool valve 174 has axially spaced apart annular lands 176, 178 and 180 and an axial passage 182 vented via a radial passage 184 to the annular recess between lands 176 and 178. Spaced apart fixed area restrictions 186 and 188 are secured in axial passage 182. A passage 190 communicates conduit 156 at regulated pressure $P_R$ with the annular recess between lands 176 and 178. Opposite ends of the spool valve 174 are vented via passages 192 and 194 to the interior of casing 122 at drain pressure $P_{IH}$ which passages 192 and 194 may be flexible, in. part, and terminate in valve seats 196 and 198, respectively, formed in fixed spaced apart relationship in a block member 200 slidably carried by casing 122. Referring to FIG. 11, a rotatable shaft or pin 202 suitably mounted in casing 122 has one end provided with an eccentric pin 204 which extends into a mating opening in block member 200. The opposite end of shaft 202 is provided with a slot 206 or the like adapted to receive a mating tool, not shown, by means of which the shaft 202 may be rotated externally of casing 122 to adjust the position of block member 200 for calibration purposes.

A ball valve 208 provided with an integral stem 210 and reciprocable between valve seats 196 and 198 is adpated to block flow out of either passage 192 or 194 and vent the remaining passage to drain pressure $P_{IH}$ depending upon which valve seat 196 or 198 it engages. To that end, the stem 210 is trapped between one arm of a follower member 212 and an arm of a lever 214 pivotally secured to said one arm of follower member 212. A compression spring 216 suitably interposed between lever 214 and casing 122 serves to preload lever 214 against stem 210 which, in turn, bears against the follower member 212.

The spring 216 preload also acts against follower member 212 tending to urge the same in a counter-clockwise direction as viewed in FIG. 11 causing a second arm of the follower member to bear against a first contoured section 217 of a three dimensional cam 218. The three dimensional cam 218 is hollow and slidably carried for rotatable and axial movement on a fixed support 220 which extends through an open end of cam 218 and is provided with an enlarged diameter differential area end portion 222 thereby defining a corresponding differential end area of cam 218. The larger end area of cam 218 is vented to regulated fuel pressure $P_R$ via a passage 224 extending through support 220 and casing 122 to a conduit 224 which, in turn, communicates with conduit 156 at pressure $P_R$ and is further vented to the interior of casing 122 at drain pressure $P_{IH}$ via a passage 228 extending through support 220 and casing 122. The area of the discharge end of passage 228 is controlled by a lever 230 pivotally secured to casing 122 and having one end or flapper coacting with passage 228. A fixed area restriction 232 is located in passage 224. A branch passage 234 vents passage 224 upstream from restriction 232 to the annular area end of cam 218. The opposite end of lever 230 is pivotally secured to the movable end of an evacuated bellows 236 having an opposite end anchored to casing 122. The bellows 236 is disposed in a chamber 238 vented to port 124 and expands or contracts in response to variations in compressor inlet air pressure $P_{T2}$ imposed thereon. A roller 240 interposed between lever 230 and a plate 242 is pivotally secured to one end of a follower member 248 the opposite end of which is slidably retained in an annular recess 250 in cam 218. The follower member 248 is pivotally secured to casing 122 and adapted to move in response to axial movement of cam 218. A compression spring 252 suitably interposed between plate 242 and an adjustable spring retainer 254 threadedly engaged with casing 122 provides a constant reference force preload against roller 240. Conventional temperature responsive discs or capsules 256 may be suitably connected between retainer 254 and spring 252 to compensate for the temperature affect on spring 252 of the fuel surrounding 252. Reference is made to U.S. Patent No. 3,232,179 for further details of a force balance network structure similar to that described above. It will be noted that the cam 218 is positioned axially as a function of the compressor inlet air pressure $P_{T2}$ by virtue of the control exercised over the pressure downstream from restriction 232.

The piston portion 154 of valve 144 is vented via a passage 258 to either drain fuel pressure $P_{IH}$ or regulated fuel pressure $P_R$ depending upon the position of a piston 260 slidably carried in casing 122 and provided with a skirt portion having an annular recess 262 partially defined by a land 264. The recess 262 is in constant communication with conduit 156 at regulated pressure $P_R$ via a passage 266. Branch passages 268 and 270 communicate with passage 258 and are traversed by land 264 to control the venting thereof to fuel pressure $P_R$ and $P_{IH}$, respectively. A passage 272 containing a spring loaded check valve 274 connects passage 258 to a passage 276 which, in turn, communicates with conduit 156 at pressure $P_R$. A compression spring 278 interposed between piston 260 and casing 122 is aided by fuel pressure $P_{IH}$ acting against piston 260 thereby urging a stop member 280 integral with piston 260 into engagement with casing 122. In the opposite direction of movement of piston 260, a fixed stop 282 serves to limit the travel thereof. The opposite side of piston 260 is vented to drain pressure $P_{IH}$ via a passage 284 containing a fixed arm restriction 288 and an adjustable restriction 286. A passage 290 containing a spring loaded check valve 292 and a damping restriction 293 communicates said opposite side of piston 260 with passage 276 upstream from a fixed restriction 294 therein. A valve member 296 suitably disposed in passage 276 for controlling flow therethrough is slidably carried in casing 122 and urged in an opening direction by a compression spring 298 interposed between casing 122 and a spring retaining flange 300 integral with valve member 296. The spring 298 is opposed by the force derived from a piston 302 slidably carried by casing 122 and bearing against the flanged end of valve member 296. The piston 302 is vented on one side to port 132 at pressure $P_{DBO}$ via a conduit 304. A branch passage 306 containing a restriction 308 vents conduit 304 to a drain passage 310 leading to port 62 at drain pressure $P_{IH}$. The opposite side of piston 302 is provided with a relatively smaller annular area portion 312 which is vented to conduit 156 at regulated fuel pressure $P_R$. The remaining area of said opposite side of piston 302 is vented to drain fuel pressure $P_{IH}$.

The passage 266 is vented to passage 276 upstream from restriction 294 via a passage 314. A differential area piston 316 slidably carried in casing 122 is provided with an integral valve portion 318 operatively connected to passage 314 to control flow therethrough. An annular area portion 320 of piston 316 is exposed to the pressurized fuel in passage 276 upstream from restriction 294. An opposite side of piston 316 is provided with a stop member 322 adapted to engage casing 122 to limit travel of piston 316 in the opening direction of valve portion 318. A compression spring 324 interposed between casing 122 and piston 316 urges valve portion 318 to a closed position. Said opposite side of piston 316 is vented to the interior of casing 122 at drain fuel pressure $P_{IH}$ via a port or passage 326 which is traversed by land portion 264 of piston 260 as will be described.

The piston portion 154 of valve 142 is vented via a passage 328 to either drain fuel pressure $P_{IH}$ or regulated fuel pressure $P_R$ depending upon the position of a piston 330 slidably carried in casing 122 and provided with a skirt portion having an annular recess 332 partially defined by a land 334. The recess 332 is in constant communication with annular recess 262 at regulated fuel pressure $P_R$ via a passage 336. Branch passages 338 and 340 communicate with passage 328 and are traversed by land 334 to control the venting thereof to fuel pressures $P_R$ and $P_{IH}$, respectively. A compression spring 342 interposed between piston 230 and casing 122 is aided by fuel pressure $P_{IH}$ acting against piston 330 to urge a stop member 344 integral with piston 330 into engagement with casing 122. The compression spring 342 is opposed by drain fuel pressure $P_{IH}$ acting against the opposite side of piston 330 which is vented to the interior of casing 122 via a passage 346 containing a fixed restriction 348 and an adjustable restriction 350. The piston 330 is adapted to engage one end of a stem 352 slidably carried by casing 122. The opposite end of stem 352 bears against an electrical switch 354 which is tripped in response to predetermined movement of stem 352. Movement of stem 352 is limited by an integral flange portion 356 adapted to engage casing 122 thereby providing a stop for piston 330. Said opposite side of piston 330 is further vented via a passage 358 containing a fixed restriction 360 and a spring loaded check valve 362 which passage 358 communicates with passage 364 leading from a flapper valve 366 to the interior of casing 122 at drain pressure $P_{IH}$. A spring loaded check valve 368 and a fixed restriction 370 are disposed in passage 364. A passage 371 connects passage 364 upstream from restriction 370 to annular recess 332. A piston 372 having a valve member 373 internal therewith is slidably carried in casing 122. A spring 374 interposed between piston 372 and casing 122 urges valve member 373 to a closed position thereby blocking passage 371. An annular area portion 375 at one end of piston 372 is exposed to passage 364. The opposite end of piston 372 is vented via a port 369 to pressure $P_{IH}$ and provided with a stop member 376 engageable with casing 122. The flapper valve 366 is suitably secured to and actuated by a flexible diaphragm 377 secured at its outermost portion to casing 122. The diaphragm 377 is vented on one side to passage 224 at regulated fuel pressure $P_R$ via a passage 378 containing fixed restrictions 379 and 380. A compression spring 381 suitably interposed between diaphragm 377 and casing 122 urges flapper valve 366 to a closed position. The opposite side of diaphragm 377 is vented via a conduit 382 including a variable area orifice 384 to passage 378 intermediate restrictions 379 and 380. A passage 385 contains a spring loaded check valve 387 connects passage 364 with passage 328. Referring to FIG. 8, in particular, a differential area piston 386 slidably carried in casing 122 is provided with an integral axially extending valve member 388 having a slotted portion 390 which coacts with orifice 384 to vary the effective flow area thereof. The large area side of piston 386 is exposed to control fuel pressure $P_X$ downstream from variable area orifice 384 and the opposite relatively smaller annular area of piston 386 is vented to passage 224 at regulated fuel pressure $P_R$. A reduced diameter extension 392 which extends from piston 386 and defines the smaller annular area side thereof is exposed endwise to the interior of casing 122 at drain fuel pressure $P_{IH}$.

A rack gear 394 fixedly secured to extension 392 meshes with a spur gear 396 integral with a shaft 398 that is rotatably mounted in casing 122. An arm 400 integral with shaft 398 is provided with a pin 402 which extends into a mating opening in cam 200 thereby causing cam 218 to rotate in response to rotation of shaft 398.

A passage 404 communicates passage 378 intermediate restrictions 379 and 380 with the interior of casing 122 at drain pressure $P_{IH}$. A valve member 406 suitably located in passage 404 controls the flow therethrough and is pivotally connected to one end of a lever 408 pivotally secured to fixed support 409. The opposite end of lever 408 is pivotally secured to a link member 410 having opposite ends fixedly secured to the movable ends of axially aligned evacuated bellows 412 and internally pressurized bellows 414, respectively. The evacuated bellows 412 is adjustably anchored at one end by a retainer 416 threadedly secured to casing 122. The bellows 414 is anchored at one end to casing 122 and vented internally to port 126 at compressor discharge air pressure $P_{S4}$ via a passage 418 having a damping restriction 420 therein. Roller means 422 suitably interposed between lever 408 and a plate 424 for rolling motion therebetween imposes a constant reference force against lever 408 in opposition to the force output of bellows 414. The constant reference force is derived from a compression spring 426 interposed between plate 424 and an adjustable spring retainer 428 threadedly secured to casing 122. The plate 424 is pivotally secured to casing 122 by means of pins 429. The retainer 428 may be provided with conventional temperature responsive discs or capsules 430 to compensate for variations in temperature of the fuel surrounding the same thereby maintaining the force output of spring 426 constant. The roller means 422 is rotatably carried on one end of an arm 432 the opposite end of arm 432 being pivotally secured to a follower member 434. The follower member 434 is pivotally secured to casing 122 and bears against a second contoured portion 436 of cam 218. A compression spring 438 interposed between casing 122 and follower member 434 preloads the latter into engagement with contoured portion 436.

The piston portion 154 of valve 146 is vented via a passage 440 to port 130 at pressure $P_{FS}$.

The piston portion 154 of valve 148 is vented via a passage 442 to a positionable valve member 444 actuated by an electric solenoid 446. The valve member 444 is adapted to engage either two orifices 448 and 450 to thereby vent passage 442 to regulated fuel pressure $P_R$ or the interior of casing 122 at drain fuel pressure $P_{IH}$. The solenoid 446 is wired to receive an engine reverse thrust, $E_{R/T}$ signal from fuel meter 46 as will be described.

The piston portion 154 of valve 150 is vented via a passage 452 to a postionable valve member 454 actuated by an electric solenoid 456. The valve member 454 is adapted to engage either of two orifices 458 and 460 to thereby vent passage 452 to regulated fuel pressure $P_R$ or the interior of casing 122 at drain fuel pressure $P_{IH}$. The solenoid 456 is wired to receive an altitude signal, $E_A$, from fuel meter 46 as will be described.

Ports 462 and 464 communicate with passages 76 and 78, respectively, leading to fluid motor 106. The ports 462 and 464 are connected via passages 466 and 468, respectively, to a control valve unit generally indicated by 470. The control valve unit 470 includes a spool valve 472 slidably carried in casing 122 and provided with axially spaced apart annular lands 474 and 476. The spool valve 472 is actuated by a differential area piston 478 integral therewith and vented on its larger area side to a control fuel pressure via a passage 480. The smaller annular area side of piston 478 is vented to regulated fuel pressure $P_R$ via a passage 482 communicating with passage 156. A compression spring 484 interposed between casing 122 and spool valve 472 preloads the latter to the position shown in FIG. 3. The lend 474 is adapted to coact with port 462 to vent the same to either the interior of casing 122 at drain pressure $P_{IH}$ or a passage 486 leading to port 134 at pressure $P_H$. Likewise, the land 476 is adapted to coact with port 464 to vent the same pressure $P_{IH}$ or passage 486 at pressure $P_H$ oppositely to that of port 462.

Port 488 communicates with passage 80 leading to fluid motor 94. The port 488 communicates via a passage 490 with a control valve unit generally indicated by 492. The control valve unit 492 includes a spool valve 494 slidably carried in casing 122 and provided with axially spaced apart lands 496 and 498. A differential area piston 500 integral with spool valve 494 actuates the latter and is vented on its large annular area side to a control fuel pressure via a passage 502. The smaller annular area side of piston 500 is vented via a passage 504 to passage 482 at regulated pressure $P_R$. A compression spring 506 interposed between casing 122 and spool valve 494 preloads the latter to the position shown in FIG. 3. The land 498 is adapted to vent passage 490 to the interior of casing 122 at drain pressure $P_{IH}$ whereas land 496 vents passage 490 to a passage 508 leading to passage 156 at pressure $P_R$.

It will be noted that conduits 156, 486, 304, and 440 are partially defined by a plate 510 removably secured in a recess 512 formed in casing 122. A locating pin 514 suitably engaging casing 122 and plate 510 serves to fix the relative positions thereof. A retaining cap 516 suitably engaged with an annular flange 518 extending outwardly from recess 512 serves to clamp plate 510 securely in position. A passage 520 communicating with the interior of casing 122 at drain pressure $P_{IH}$ in blocked by plate 510. Suitable fluid seals such as 0 rings 522 are interposed as required between plate 510 and casing 122 to prevent fluid leakage therebetween.

Referring to FIG. 12, for ground checkout operation of the bleed valve control 60 the plate 510 may be removed and a plate 524 substituted therefor, the plate 524 is provided with passages 526, 528, 530, 532 and 534 which may be coupled to supply fluid lines leading from suitable ground checkout equipment, not shown, to pressurize the conduits 156, 486, 304, 440 and 520 with predetermined fuel pressure signals as indicated in FIG. 12 to verify the response of the bleed valve control 60. It will be noted that the plate 524 overlaps conduits 156, 486, 304 and 440 leading from ports 136, 134, 132 and 130, respectively to isolate said ports from the fuel pressure derived from the ground checkout equipment.

Referring to FIG. 3, in particular, the bleed valve control passages 82, 84, 86, 88 and 90 are connected to valve units 536, 538, 540, 542 and 544 which are conventional and will not be described in detail except to the extend necessary to show the transducing functions thereof between the input fuel pressure signals thereto and the corresponding output air pressure signals therefrom. It will be noted that only one of the valve units 536, 538, 540, 542 and 544 is shown in section since the remaining units are identical thereto. In general, the valve unit 544 is provided with two orifices 546 and 548 as well as two valve sections 550 and 552 which valve sections are adapted to close orifice 546 and open orifice 548 or the reverse depending upon the position of valve sections 550 and 552. Assuming orifice 546 opened and orifice 548 closed compressor discharge air at pressure $P_{S4}$ is vented from conduit 92 to conduit 90 whereas with orifice 546 closed and orifice 548 opened the conduit 90 is vented to a relatively low air pressure source such as ambient or atmospheric air pressure $P_A$. The valve sections 550 and 552 are connected to and actuated by a stem 554 provided with a disc or the like 556 which is outwardly visible through a suitable opening 558 to provide an indication of the position of valve sections 550 and 552 to an observer conducting ground checkout operation. A compression spring 560 interposed between disc 556 and casing 562 of valve unit 544 serves to load stem 554 against an oppositng force derived from a piston 564 slidably carried in casing 122 and vented on one side via a passage 566 to the output side of valves 140, 142, 144, 146, 148 and 150 as will be described below.

The opposite side of piston 564 is exposed to the interior of casing 122 at drain fuel pressure $P_{IH}$.

The remaining valve units 536, 538, 540 and 542, like valve unit 544, are connected to the output side of valves 140, 142, 144, 146, 148 and 150 via associated passages 568, 570, 572 and 574 as will be described.

Figure 10:
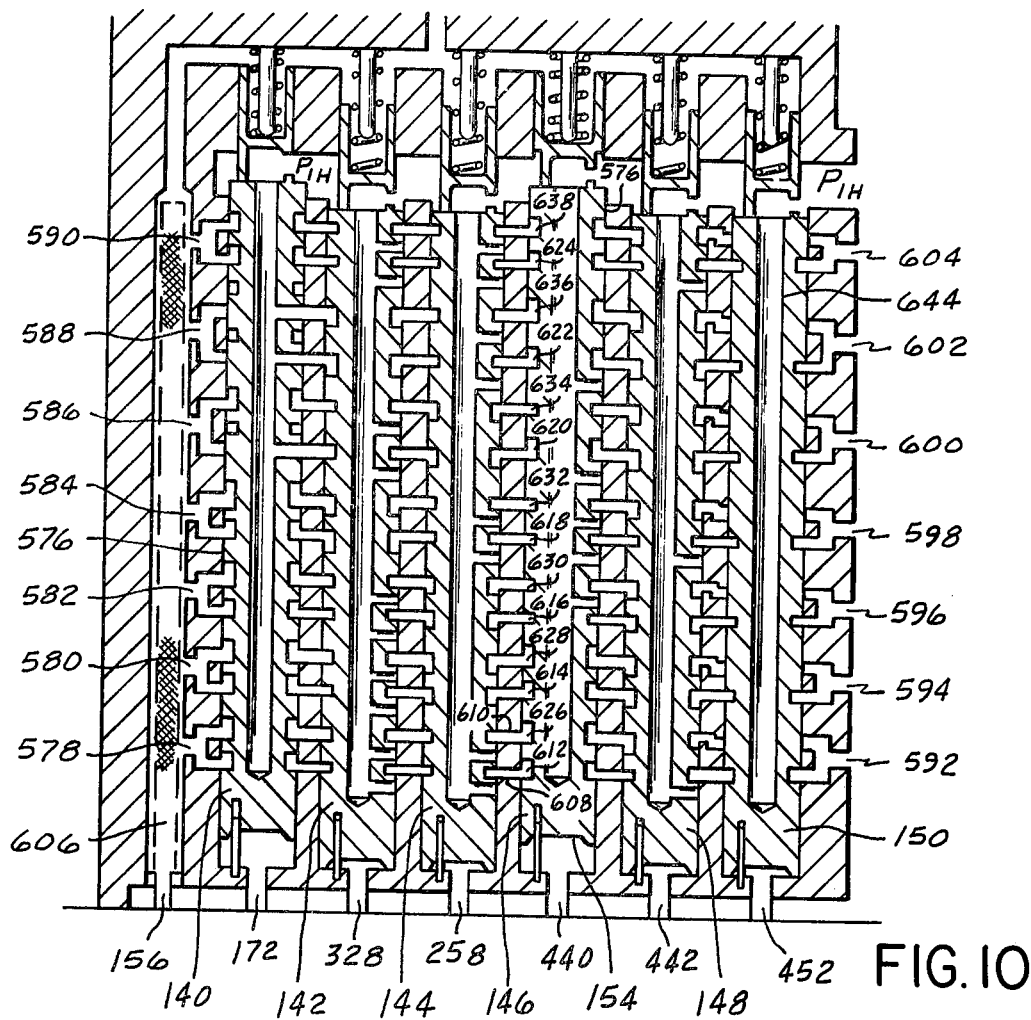
FIG. 10 is a schematic view of the multiple valve network of FIG. 3 showing the porting arrangement thereof.

Referring to FIGS. 3 and 10, the valves 140, 142, 144, 146, 148 and 150 are each slidably carried in an associated cylinder 576 in casing 122 and arranged in series flow relationship between a plurality of bifurcated fuel input ports 578, 580, 582, 584, 586, 588, 590 and associated bifurcated fuel output ports 592, 594, 596, 598, 600, 602, 604. The fuel input ports 578, 580, 582, 584, 586, 588 and 590 communicate with passage 156 at regulated fuel pressure $P_R$ which passage 156 is provided with a fuel filter 606 suitably disposed therein to filter the fuel passing to said input ports. The fuel input ports 578 through 590 and associated fuel output ports 592 through 604 are connected via two parallel flow conduits which, in part, are defined by diametrically spaced apart passage segments 608 and 610, respectively, in casing 122 between adjacent cylinders 576. Fluid communication between the passage segments 608 is controlled by valves 140 to 150 inclusive each of which are provided with a plurality of axially spaced apart slots 612, 614, 616, 618, 620, 622, 624 on one side (see FIG. 3) and a plurality of diametrically opposite axially spaced apart slots 626, 628, 630, 632, 634, 636, 638 formed therein and adapted to register with associated passage segments 608 and 610. Referring to FIG. 9, one of the valves, namely valve 146, is shown in perspective and is typical of the remaining valves 140, 142, 144, 148 and 150. It will be noted that the axial width of slots 612 to 624, inclusive, corresponds to that shown schematically in valve 146 in FIG. 3. Radially directed vent passages 640 and 642 intermediate slots 616, 168 and 618, 620, respectively, communicate with an axially extending vent passage 644 which, as shown in FIG. 3, leads to the interior of casing 122 at drain pressure $P_{IH}$. Similar radially extending passages 644, 646 and 648 intermediate slots 630, 632; 632, 634; and 634, 636, respectively, on the opposite side of valve 146 communicate with passage 644. It will be noted that the slots 612 to 624 as well as slots 626 to 638 in valve 146 vary in axial width and may be termed single or double width to distinguish the narrower slots from the wider slots. The remaining valves 140, 142, 144, 148 and 150, likewise, are provided with single and double width slots. However, it will be understood that the sequence of single and double width slots as well as the radially directed vent passages intermediate the same varies to provide the desired communication with passage segments 608 as will be described.

Referring to FIG. 10, the passage segments 608 and 610 in casing 122 as well as slots 612 through 624, 626 through 638 and associated radially extending passages intermediate the same are drawn in one plane to provide a visual representation of the positions of the various slots relative to the passage segments for a given position of the valve 146. Likewise, the remaining valves 140, 142, 144, 148 and 150 are drawn with all of the slots and radially extending passages thereof as well as associated passage segments in casing 122 in one plane.

MODE OF OPERATION OF THE PREFERRED EMBODIMENT

It will be assumed that the aircraft is on the ground and the engine is shut down such that the various control fluid pressure $P_{IH}$, $P_{FS}$, $P_{DBO}$, $P_H$, $P_M$, $P_{t2}$ and $P_{S4}$ supplied to bleed valve control 60 are at a common pressure in response to which the valves 140 through 150 occupy what may be termed down positions in response to associated springs 166 bearing thereagainst.

An engine start at ground level is accomplished in the conventional manner rendering the fuel pump 54 operative which in turn, results in the various control fuel pressures in the fuel meter 46 as well as bleed valve control 60 to increase to the respective operating levels. The electric solenoid 456 is de-energized in response to an altitude signal $E_A$ derived from fuel meter 46 and representative of ground level operation thereby positioning valve 454 as shown in FIG. 2.

Referring to FIG. 10, with the valves 140 through 150 in the down position as indicated above it will be noted that the passage segments 610 are blocked and passage segments 608 vented to associated outlet ports 592 to 604, thus, the inlet port 578 is vented to outlet port 592 via passage segments 608 which are interconnected by slots 612 of valves 140 through 148. Likewise, the inlet ports 580, 586, 588 and 590 are vented to respective outlet ports 594, 600, 602, and 604, respectively, via the associated passage segments 608 and valves 140 to 150, inclusive, as evident from FIG. 10. Communication between inlet ports 582, 584 and outlet ports 596, 598, respectively, is blocked by valve 146 which also vents outlet ports 596 and 598 to drain pressure $P_{IH}$ via radially extending passages 640 and 642, respectively, which register with associated passage segment 608. Therefore, outlet ports 592, 594, 600, 602 and 604 are pressurized at regulated pressure $P_R$ whereas outlet ports 596 and 598 are pressurized at drain pressure $P_{IH}$. Referring to FIG. 3, it will be noted that the pistons 564 of valve units 544, 542 and 536 which are pressurized by outlet ports 592, 594 and 600, respectively, are pressurized upwardly as viewed in FIG. 3 thereby closing the respective orifices 548 and opening orifices 546 which, in turn, vents compressor discharge air at pressure $P_{S4}$ to associated passages 90, 88 and 82 which, in turn, pressurizes opposed bleed valves 114 as well as one bleed valve 112 to a closed position.

The pistons 564 of valve units 538 and 540 which are depressurized by outlet ports 598 and 596, respectively, at drain pressure $P_{IH}$ are pressurized downwardly as viewed in FIG. 3 thereby closing the respective orifices 546 and opening orifices 548 which, in turn, vents associated passages 84 and 86 to atmospheric air pressure $P_A$ which, in turn, allows the remaining three bleed valves 112 to open under the influence of relatively high pressure compressor air acting thereagainst.

The outlet ports 602 and 604 at regulated pressure $P_R$ communicate with valve units 470 and 492 wherein pistons 478 and 500, respectively, are pressurized accordingly against respective springs 484 and 509. Lands 476 and 474 of spool valve 472 vent passages 78 and 76 to drain pressure $P_{IH}$ and $P_H$ pressure, respectively, thereby pressurizing fluid motor 106 in a direction to close bleed valves 98. Lands 496 and 498 of spool valve 492 vent passage 80 to fluid motor 94 to pressurize the inlet guide vanes 96 to a predetermined position.

In view of the above, it will be seen that three bleed valves 112 are activated to an open position during engine start operation at ground level. In the event of an engine start at altitude, the abovementioned three valves 112 plus the remaining valve 112 are opened. To that end in aircraft flight, the electric solenoid 456 is energized by an appropriate altitude signal $E_A$ from fuel meter 46 causing the valve 454 to move into engagement with orifice 460 thereby venting passage 452 to regulated fuel pressure $P_R$ which is transmitted to piston 154 of valve 150 thereby actuating valve 150 to its up position against associated stop 168. In the up or altitude position, valve 150 switches communication between inlet ports 578 to 590 and associated outlet ports 592 to 604 from passage segments 608 which is blocked by valve 150 to passage segment 610 which registers with the slot in valve 150. The radially extending passage 648 in valve 146 vents passage segment 610 and thus outlet port 600 to drain pressure $P_{IH}$ thereby depressurizing piston 564 of valve unit 536 which, in turn, vents passage 82 to atmospheric pressure $P_A$ causing the remaining closed bleed valve 112 to open. Thus all four bleed valves 112 are open during an altitude start.

When the engine has attained a self-sustaining speed, the fuel meter 46 functions to increase pressure $P_{FS}$ to port 130 thereby pressurizing valve 146 upward against associated stop 168 which results in all of the radially extending passages 640, 642, 644, 646 and 648 therein being blocked as shown in FIG. 10. All of the inlet ports 578 to 590 are connected to associated outlet ports 592 to 604 via interconnected passage segments 608 thereby pressurizing pistons 564 of valve units 536 to 542 to close orifices 548 and open orifices 546 thereof which, in turn, results in all of the bleed valves 120 and 122 being pressurized by compressor discharge air to a closed position. Likewise, the bleed valves 98 are closed in response to the valve unit 470 which is positioned to vent passages 78 and 76 to drain fuel pressure $P_{IH}$ and regulated fuel pressure $P_R$, respectively.

The following table is a condensed representation of the above described operation for an engine start:

| ENGINE START (Valve 146 Down) | | | |
|---|---|---|---|
| GROUND LEVEL (Valve 150 Down) | | ALTITUDE (Valve 150 Up) | |
| Outlet Ports Depressurized | Bleed Valves Open | Outlet Ports Depressurized | Bleed Valves Open |
| 596, 598 | (3) 112 | 596, 598, 600 | (4) 112 |
| AFTER ENGINE START (Valve 146 Up) NO BLEED VALVE OPENING REQUESTED | | | |

The three dimensional cam 200 is rotated as a function of compressor discharge air pressure $P_{S4}$ and positioned axially as a function of compressor inlet air pressure $P_{t2}$. To that end the bellows 414 responds to pressure $P_{S4}$ causing valve 406 to move accordingly thereby regulating the fuel pressure downstream from restriction 379 and pressurizing piston 386 accordingly which moves causing rotation of spur gear 396 and thus cam 218. The follower 434 bearing against cam surface 436 which provides a piston 386 position feedback signal actuates roller 422 causing the lever arm of lever 408 through which the constant reference force spring 426 acts to vary accordingly thereby balancing the input torque on lever 408 imposed by bellows 414 to null valve 406 and thus piston 386.

Referring to FIG. 11 in particular, the cam surface 217 on cam 200 provides a predetermined compressor pressure rise $P_{S4}$-$P_{t2}$ schedule by means of which the follower 212 bearing against cam surface 217 is actuated to position ball valve 208 against either seat 196 or 198. Below a scheduled pressure $P_{S4}$, the follower 212 is in the position shown in FIG. 2 whereby the ball valve 208 is seated against seat 196 which, in turn, pressurizes spool valve 174 to the right as shown thereby venting passage 156 at regulated pressure $P_R$ to passage 172 in response to which the valve 140 is urged upward against associated stop 168. In its up position, the valve 140 blocks bifurcated inlet port 588 and via radially directed passages therein vents passage segments 608 and 610 communicating with outlet port 602 to drain fuel pressure $P_{IH}$ which, in turn, depressurizes piston 478 of spool valve 472 allowing the latter to move to the right under the influence of spring 484. As shown in FIG. 3, the lands 474 and 476 vent passages 76 and 78 to drain pressure $P_{IH}$ and regulated pressure $P_R$, respectively, which results in pressurization of fluid motor 106 in a direction to open bleed valves 98. Also, the valve 140 blocks the passage segment 608 side of inlet port 586 and via a radially directed passage in valve 140 vents passage segments 608 communicating with outlet port 600 to drain pressure $P_{IH}$. The resulting depressurization of piston 564 of valve unit 536 causes passage 82 to be vented to atmospheric air pressure $P_A$ allowing associated bleed valve 112 to open.

Above the predetermined pressure $P_{S4}$, the cam surface 198 actuates follower 212 which pivots clockwise actuating ball valve 208 away from seat 196 and into engagement with seal 198 thereby venting passage 192 to drain pressure $P_{IH}$ and passage 194 to regulated pressure $P_R$. The spool valve 174 is caused to move to the left with "snap action" as viewed in FIG. 2. To that end, the pressure $P_{IH}$ applied to the left hand end of spool valve 174 reduces the force holding the valve 174 to the right and the pressure $P_R$ acting against the relatively small annular area end of valve 174 causes the same to move toward the left. The initial movement of valve 174 allows pressure $P_R$ to pass to the larger annular area end of land 180 thereby pressurizing the entire cross sectional area of valve 174 which moves with a snap action to the left causing lands 178 and 180 to vent passage 172 to drain pressure $P_{IH}$ thereby depressurizing piston 154 of valve 140 which moves downwardly under the influence of associated spring 166. It will be understood that the orifices 196, 198 and associated restrictions 186, 188 are sized so that the position of the ball valve 208 between orifices 196 and 198 is over center at the point where spool valve 174 starts to move. The down position of valve 140 results in the radially directed passages thereof moving out of registry with adjacent passage segments 608 and 610 and single width slots in valve 140 connecting adjacent passage segments 608 thereby venting regulated pressure $P_R$ to outlet ports 600 and 602 which results in closing of previously open bleed valve 112 and four bleed valves 98.

The following table is a condensed representation of the above described operation of valve 140 which may be termed a compressor rise (C/R) valve:

| LOW SPEED COMPRESSOR (Valve 140 Up) PRESSURE RISE | | | |
|---|---|---|---|
| Ground Level (Valve 150 Down) | | Altitude (Valve 150 Up) | |
| Outlet Ports Depressurized 600, 602 | Bleed Valves Open (1) 112, (4) 98 | Outlet Ports Depressurized 602 | Bleed Valves Open (4) 98 |
| HIGH SPEED COMPRESSOR PRESSURE RISE (Valve 140 Down) | | | |
| No Bleed Valve Opening Requested | | | |

The valve 142 which may be termed a stall valve is actuated in response to a predetermined compressor operating condition indicative of compressor stall thereof. To that end, the velocity of piston 386 is utilized as the primary input to the diaphragm 372. It is known that a predetermined rate of change of compressor discharge pressure $P_{S4}$ is indicative of a compressor stall condition. Assuming for discussion purposes that the predetermined rate of change of compressor discharge pressure $P_{S4}$ at stall is 2600 psi/sec. at a 400 psia $P_{S4}$ level, the relationship may be written:

(1) $P_{S4}/dt = -6.5\ P_{S4}$ psi/sec

The piston 386 feedback cam contour 436 is non-linearized relative to axial movement of piston 386 and may be written:

(2) $Y = .04\ (P_{S4})^{1/2}$

Differentiating (2) above gives:

(3) $$\frac{dy}{dt} = .02\ (P_{S4})^{-1/2}\ \frac{d P_{S4}}{dt}$$

At compressor stall:

(4) $$\frac{dy}{dt} = -3.25y$$

The pressure drop $P_X - P_X'$ generated across the diaphragm 372 is related to the piston 386 velocity by:

(5) $$KC_vA_v\ (P_X-P_X')^{1/2} = -A_x\ \frac{dy}{dt}$$

wherein K is a predetermined constant in inches/sec. psi, $C_v$ is the usual coefficient used in orifice flow calculations, $A_v$ is the flow area of slot 390 and thus orifice 384, $P_X'$ is the fuel pressure on the spring side of diaphragm 377, $P_X$ is the fuel pressure on the opposite side of diaphragm 377 and $A_x$ is the effective area of piston 386 exposed to pressure $P_X$.

To produce a constant pressure drop $P_X - P_X'$ across diaphragm 377 at compressor stall the contour of slot 390 versus travel of piston 386 is made linear as follows:

(6) $A_v = .00932y$

Solving for the diaphragm 377 pressure drop $P_X - P_X'$ at compressor stall gives:

$$(7) \quad P_X - P_X' = -\left[\frac{A_x}{KC_v}\left(\frac{-3.25y}{.00932y}\right)\right]^2 = \text{Constant}$$

In view of the above, it will be recognized that an increasing compressor discharge pressure $P_{S4}$ applied to bellows 414 results in movement of valve 406 and a corresponding pressure $P_X$ increase to which the piston 386 responds.

As the piston 386 moves, the $P_X - P_X'$ pressure differential varies as a predetermined function of the velocity of piston 386 as indicated by equation (5) above. When the $P_X - P_X'$ pressure differential generated by the $d P_{S4}/dt$ in the decreasing $P_{S4}$ direction is indicative of compressor stall condition, the diaphragm 377 and thus flapper valve 366 is urged against spring 381 thereby venting $P_X$ to passage 364 causing check valve 368 to open thereby passing fuel at pressure $P_X$ through passage 364 to annular area portion 375 of piston 372. The piston 372 is pressurized against spring 374 causing stop member 376 to engage casing 122 thereby opening valve member 373 to vent regulated fuel pressure $P_R$ from annular recess 332 to passage 364 which results in reinforcement of pressure $P_X$ in passage 364. The check valve 368 prevents backflow through flapper valve 366. The check valve 387 opens thereby admitting pressure $P_R$ to passage 328 thereby initiating bleed valve opening as will be described. The check valve 362 opens thereby admitting pressure $P_R$ to piston 330. The flow through check valve 362 and restriction 360 downstream therefrom to piston 330 pressurizes piston 330 downward into engagement with stop member 352 which trips switch 354 thereby providing an electrical signal to fuel meter 46 indicating a stall condition. Upon engagement of piston 330 with stop 352, the annular recess 332 has registered with port 369 thereby venting regulated pressure $P_R$ to the spring side of piston 372 causing the same to move upward thereby closing the valve member 373 which cuts off pressure $P_R$ to pasage 364 allowing check valve 387 and 362 to close. The annular recess 332 also registers with port 338 which, in turn, communicates pressure $P_R$ to passage 328. The communication between annular recess 332 and port 338 is maintained for a predetermined interval of time as piston 330 begins to move under the influence of spring 342. To that end, the spring 342 forces piston 330 upward at a predetermined velocity dependent upon the effective flow area of fixed restriction 348 and adjustable restriction or timing bleed 350 through which fuel opposing movement of piston 330 is vented to drain fuel pressure $P_{IH}$. As the piston 330 moves upward in response to spring 342, the land 334 registers with port 338 shutting off pressure $P_R$ thereto. Upon engagement of stop 344 with casing 122, the land 334 blocks port 338 and vents port 340 to drain fuel pressure $P_{IH}$ thereby depressurizing passage 328 accordingly which, in turn, results in closing of the bleed valves controlled by valve 142.

In the event that the flapper valve 366 is opened by diaphragm 377 as a result of a subsequent compressor stall condition which may occur while piston 330 is moved through the abovementioned timed cycle, it will be recognized that the piston 372 will respond to the resulting pressure $P_X$ imposed therein and open valve member 373 to recycle piston 330 downward into engagement with stop 352 in the heretofore mentioned manner. The abovementioned timed cycle of operation of piston 330 will restart upon removal of the stall input signal derived from pressure $P_X$ imposed on passage 364.

The pressure $P_R$ vented to passage 328 by piston 330 in the abovementioned manner results in pressurization of piston 154 of valve 142 which moves up against associated stop 168 and vents passage segments 608 leading to outlet ports 604, 600, 596, 594 and 592 to drain fuel pressure $P_{IH}$ via radially extending passages in valve 142. The resulting depressurization of outlet port 604 and thus piston 500 causes spool valve 494 to move to the left under the influence of spring 506 as viewed in FIG. 3. Lands 496 and 498 vent passage 80 to passage 508 at pressure $P_M$ thereby pressurizing fluid motor 94 which, in turn, repositions inlet guide vanes 96 for a predetermined time interval as a result of the timed cycle of operation of piston 330.

The depressurization of outlet port 600 and subsequent venting of passage 82 to atmospheric air pressure $P_A$ causes associated bleed valve 112 to open. Likewise, the depressurization of inlet ports 596, 594 and 592 results in venting of passages 86, 88 and 90, respectively, to atmospheric air pressure $P_A$ which, in turn, opens associated bleed valves 112 and 116 for a predetermined time interval as a result of the timed cycle of operation of piston 330.

The following table is a condensed representation of the abovementioned operation for a compressor stall condition:

| COMPRESSOR STALL CONDITION (Valve 142 Up) | | | |
|---|---|---|---|
| Ground Level (Valve 150 Down) | | Altitude (Valve 150 Up) | |
| Outlet Ports Depressurized | Bleed Valves Open | Outlet Ports Depressurized | Bleed Valves Open |
| 604, 600, 596 594, 592 | (3) 112 (2) 116 Also Guide Vanes 96 Repositioned | Same as Ground Level | Same as Ground Level |

The piston 302 vented to port 132 at pressure $P_{DBO}$ is pressurized to the positions shown in FIG. 2 except during an engine deceleration when the pressure $P_{DBO}$ derived from fuel meter 46 undergoes a decrease indicative of an engine deceleration. A decreasing pressure pulse in pressure $P_{DBO}$ causes piston 302 and thus valve member 296 bearing thereagainst under the influence of compression spring 298 as well as drain pressure $P_{IH}$ and regulated pressure $P_R$ acting on the respective area of piston 302 to move downward thereby venting fuel at regulated pressure $P_R$ through passage 276 to passage 272 and 290 as well as annular area portion 320 of piston 316. The piston 316 is pressurized downwardly to the extent provided by stop 322 which engages casing 122. Valve 318 integral with piston 316 opens thereby venting pressure $P_R$ through passage 314 to passage 276 thereby reinforcing pressurization of passage 276. The check valves 274 and 292 open in response to pressure $P_R$ venting pressure $P_R$ to passage 258 and piston 260, respectively. The piston 260 provides a predetermined timed cycle of pressurization of passage 276 and operates in the same manner as piston 330 heretofore described. Thus piston 260 is pressurized into engagement with stop 282 causing land 264 to block passage 270 and vent annulus 262 at pressure $P_R$ to passage 268 which passage 268, in turn, vents pressure $P_R$ to passage 258 thereby causing check valve 274 to shut. The land 264 also vents annulus 262 to passage 326 thereby pressurizing piston 316 upward resulting in closing of valve 318. The pressure in passage 276 dissipates by virtue of restriction 294 whereupon check valve 292 closes. The piston 260 moves upward under the influence of spring 278 and forces fuel through restrictions 286 and 288 which restricts the velocity of piston 260 to a predetermined rate. The adjustable restriction 286, like restriction 350 heretofore described may be adjusted to establish a desired effective flow area which restricts the velocity of piston 260 accordingly. Upon engagement of stop 280 with casing 122, the land 264 has blocked passage 268 and vented passage 270 to drain pressure $P_{IH}$ thereby depressurizing passage 258 accordingly.

It will be understood that the piston 316, like piston 372 heretofore described, may be reactivated to open valve 320 and restart the timed cycle of operation of piston 260 in the event that a second or subsequent deceleration signal $P_{DBO}$ is imposed on valve 296 to open same before the heretofore described upward movement of piston 260 is completed thereby maintaining a corresponding pressurization of passage 258.

The pressurization of passage 258 with pressure $P_R$ in the abovementioned manner results in pressurization of piston 150 and thus valve 144 upward against associated stop 168. The radially extending passages in valve 144 register with associated passage segments 608 and 610 communicating with their respective outlet ports 604, 602, 598 and 592 thereby venting said outlet ports to drain fuel pressure $P_{IH}$. The resulting depressurization of piston 500 and leftward movement of spool valve 494 results in pressurization of passage 80 with pressure $P_M$ and corresponding positioning of fluid motor 94 and thus inlet guide vanes 96 in the heretofore described manner.

Depressurization of outlet port 602 and thus piston 478 vented thereto results in spool valve 472 moving to the position indicated in FIG. 3. Lands 474 and 476 vent passage 76 to drain fuel pressure $P_{IH}$ and passage 78 to pressure $P_H$ which, in turn, pressurizes fluid motor 106 in a direction to open bleed valves 98 (see FIG. 13).

Depressurization of outlet port 598 and thus valve unit 538 results in venting of passage 84 to atmospheric air pressure $P_A$ which, in turn, permits associated bleed valve 114 to open.

Depressurization of outlet port 592 and thus valve unit 544 results in venting of passage 90 to atmospheric air pressure $P_A$ thereby causing associated bleed valve 120 to open.

The above described upward pressurization of valve 144 in response to a deceleration signal $P_{DBO}$ exists for a predetermined time interval after which the valve 144 is depressurized causing the same to return to its down position to pressurize outlet ports 604, 602, 598 and 592 thereby causing inlet guide vanes 96 to return to their original position and associated bleed valves 98, 112 and 120 to close.

The following table is a condensed representation of the above described operation for an engine deceleration condition:

| ENGINE DECELERATION CONDITION (Valve 144 Up) | | | |
|---|---|---|---|
| Ground Level (Valve 150 Down) | | Altitude (Valve 150 Up) | |
| Outlet Ports Pressurized | Bleed Valves Open | Outlet Ports Pressurized | Bleed Valves Open |
| 604, 602, 598, 592 | (4) 98 (1) 112 (1) 120-Also Guide Vanes 96 Repositioned | Same as Ground Level | Same as Ground Level |

The valve 148 is activated in response to an engine reverse thrust signal $E_{R/T}$ derived from fuel meter 46 and indicative of conventional engine reverse thrust operation as, for example, during an aircraft landing. The solenoid 446 is energized by the electrical signal $E_{R/T}$ derived from fuel meter 46 causing valve 444 to move against orifice 450 thereby opening orifice 448 to vent passage 442 to regulated fuel pressure $P_R$. The valve 148 is actuated accordingly upward against its associated stop 168 thereby placing radially directed passages of valve 148 into registry with passage segments 608 communicating with outlet ports 604, 598 and 592. The resulting venting of outlet ports 604 to drain pressure $P_{IH}$ depressurizes piston 500 which actuates spool valve 494 to vent passage 80 to pressure $P_M$ thereby positioning guide vanes 96 accordingly. The depressurization of outlet ports 598 and 592 and thus valve units 538 and 544, respectively, results in venting of passages 84 and 90 to atmospheric air pressure $P_A$ which, in turn, causes associated bleed valves 112 and 120 to open.

The following table is a condensed representation of the above described operation for a reverse thrust operating condition:

| REVERSE THRUST CONDITION (Valve 148 Up) | | | |
|---|---|---|---|
| Ground Level (Valve 150 Down) | | Altitude (Valve 150 Up) | |
| Outlet Ports Pressurized | Bleed Valves Open | Outlet Ports Pressurized | Bleed Valves Open |
| 604, 598, 592 | (1) 112 (1) 120 Also Guide Vanes 96 Repositioned | ALL | NONE |

It will be noted that regardless of the positions of the valves 140 through 148 one or more of the outlet ports 592 through 604 may be depressurized to command opening of the associated bleed valve or inlet guide vane repositioning.

It will be noted that the pistons 154 of valves 140 to 150 and the pistons 564 of valve units 536 to 544 alternate in their flow demand in that the pistons 154 demand servo fuel flow at pressure $P_R$ to open the engine bleed valves while the pistons 564 demand servo flow at pressure $P_R$ to close the engine bleed valves. This reduces the maximum transient servo flow demand and, therefore, minimizes the time required for the bleed valve control 60 to signal the engine bleed valves open or closed.

The above described control program over the bleed valves may be easily and quickly varied as required to suit a given engine by removing one or more of the valves 140 to 150 and replacing the same with one having slots and/or vent passage suitably located therein to provide the desired control program over the bleed valves. Since each valve 140 to 150 is responsive to a different input signal, changing a system valve results in a program change for the associated engine operation from which the input signal is derived.

Obviously, the present invention is not restricted to control of compressor bleed valves as described in the preferred embodiment. For example, the valves 140 to 150 may be utilized to control a plurality of output fluid signals in a predetermined sequence as a function of a plurality of control input signals applied thereto. The above described apparatus for computing and/or scheduling the input pressure signals to the various pistons 154 may be modified to compensate for the control mode selected.

I claim:

1. Gas turbine engine compressor air bleed control apparatus comprising:
   a plurality of first valve means operatively connected to said compressor for venting pressurized air from selected stages thereof;
   fluid pressure responsive control means operatively connected to each of said first valve means for actuating the same;
   a first source of pressurized fluid;
   a second source of pressurized fluid at a lower pressure relative to said first source;
   conduit means communicating said first source of pressurized fluid with said control means;
   a plurality of second valve means operatively connected to said conduit means in series flow relationship for venting the same to said second source of pressurized fluid depending upon the relative positions of said second valve means; and
   second control means responsive to a variable condition of engine operation operatively connected to each of said plurality of second valve means for actuating the same independently of the remaining valve means.

2. Compressor air bleed control apparatus as claimed in claim 1, wherein:
   said conduit means includes parallel first and second flow passages;
   said plurality of valve means includes a valve member having a first position wherein one of said first and second flow passages is blocked and a second position wherein the other of said first and second flow passages is blocked.

3. Compressor air bleed control apparatus as claimed in claim 2, wherein:
   said second control means connected to actuate said valve member is responsive to engine operating altitude.

4. Compressor air bleed control apparatus as claimed in claim 2, wherein:
   said plurality of second valve means further includes a plurality of second valve members each of which has a first position and a second position in response to said control means connected to actuate the same.

5. Compressor air bleed control apparatus as claimed in claim 1, wherein:
   said condition of engine operation includes compressor pressure ratio.

6. Compressor air bleed control apparatus as claimed in claim 4, wherein:
   said plurality of second valve means includes third, fourth, fifth, sixth and seventh valve members wherein the associated control means is responsive to an engine start condition, compressor stall condition, engine deceleration condition, compressor pressure ratio condition and engine reverse thrust condition, respectively.

7. Compressor air bleed control apparatus as claimed in claim 1, wherein:
   said second valve means is fluid pressure responsive and provided with a piston portion;
   said second control means includes fluid pressure generating means operatively connected to said piston for imposing a variable control fluid pressure thereon.

* * * * *